US009463758B2

United States Patent
Tamura et al.

(10) Patent No.: US 9,463,758 B2
(45) Date of Patent: Oct. 11, 2016

(54) CRASH BOX AND AUTOMOBILE CHASSIS

(71) Applicant: NIPPON STEEL & SUMITOMO METAL CORPORATION, Tokyo (JP)

(72) Inventors: Kenji Tamura, Tokyo (JP); Yoshiaki Nakazawa, Tokyo (JP); Masahito Tasaka, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 14/422,244

(22) PCT Filed: Aug. 15, 2013

(86) PCT No.: PCT/JP2013/071979
§ 371 (c)(1),
(2) Date: Feb. 18, 2015

(87) PCT Pub. No.: WO2014/030592
PCT Pub. Date: Feb. 27, 2014

(65) Prior Publication Data
US 2015/0197206 A1    Jul. 16, 2015

(30) Foreign Application Priority Data

Aug. 21, 2012  (JP) .................. 2012-182490

(51) Int. Cl.
| B60R 19/34 | (2006.01) |
| B60R 19/18 | (2006.01) |
| F16F 7/12 | (2006.01) |
| B60R 19/02 | (2006.01) |

(52) U.S. Cl.
CPC ............. *B60R 19/18* (2013.01); *B60R 19/023* (2013.01); *B60R 19/34* (2013.01); *F16F 7/12* (2013.01)

(58) Field of Classification Search
CPC ..... B60R 19/18; B60R 19/023; B60R 19/43; F16F 7/12
See application file for complete search history.

(56) References Cited

U.S. PATENT DOCUMENTS

| 7,252,314 B2* | 8/2007 | Tamura ................... F16F 7/123 293/133 |
| 7,896,411 B2* | 3/2011 | Kano ........................ F16F 7/12 293/133 |
| 2009/0152901 A1* | 6/2009 | Takeuchi ............. B62D 25/161 296/203.01 |
| 2011/0291431 A1* | 12/2011 | Buschsieweke ........ B60R 19/34 293/133 |

FOREIGN PATENT DOCUMENTS

| JP | 08-128487 | 5/1996 |
| JP | 08-108863 | 11/1996 |
| JP | 09-277953 | 10/1997 |

(Continued)

*Primary Examiner* — Lori L Lyjak
(74) *Attorney, Agent, or Firm* — Clark & Brody

(57) ABSTRACT

Provided is a crash box having improved robustness, wherein an angle of the pair of corner portions is set to 90° or larger and 150° or smaller, an angle of the another pair of corner portions is set to 30° or larger and 90° or smaller, one or more inwardly convex trench portions extending in a longitudinal direction are provided, a cross-sectional peripheral length of the tubular body in the one end side is shorter than a cross-sectional peripheral length of the tubular body in the other end side, an aspect ratio between the longest one and the shortest one of diagonal lines of a polygon changes depending on a position on the axial direction of the tubular body, and overall sides on the cross section in the one end are formed in parallel to the opposite sides on the cross section in the other end.

10 Claims, 15 Drawing Sheets

(56) References Cited

FOREIGN PATENT DOCUMENTS

| JP | 2002-284033 | 10/2002 |
| JP | 2003-48569 | 2/2003 |
| JP | 2009-018447 | 1/2009 |
| JP | 2011-051581 | 3/2011 |
| JP | 3912422 | 6/2013 |

* cited by examiner

Fig. 4A
Fig. 4B
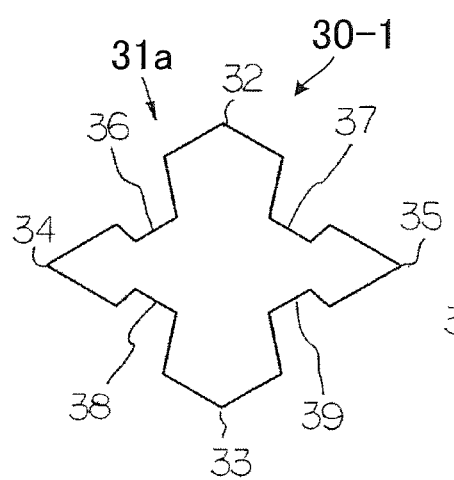
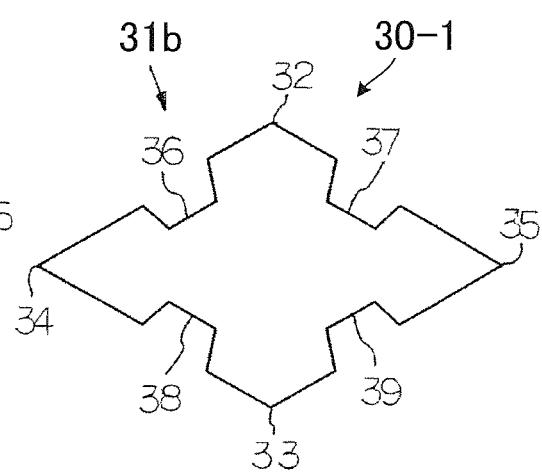

Fig. 10A
Fig. 10B
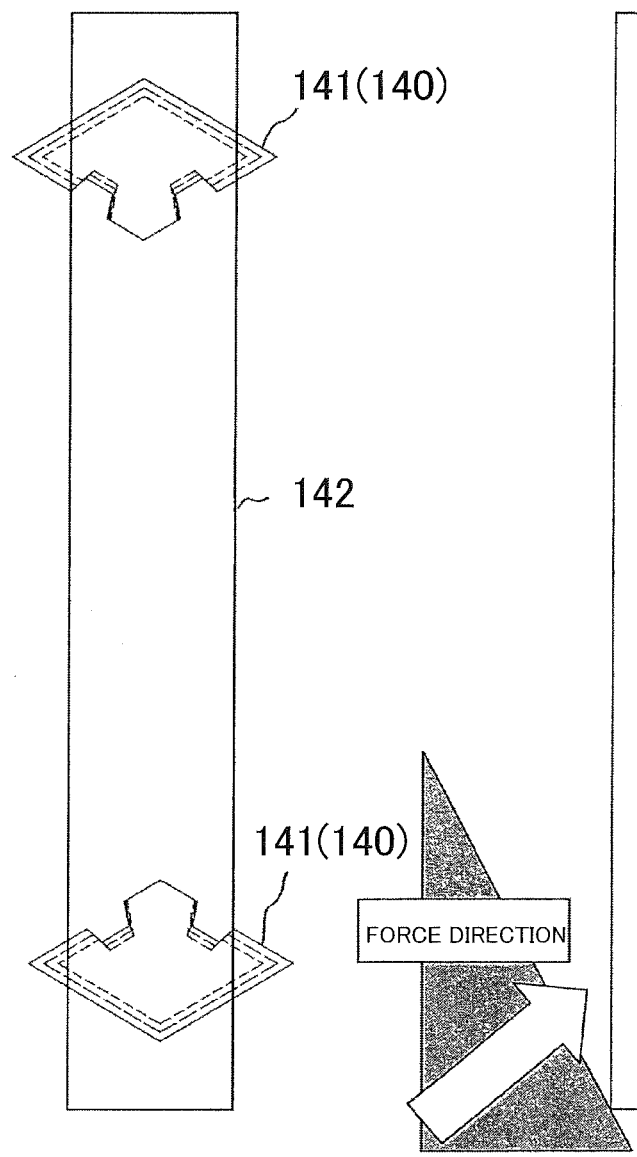
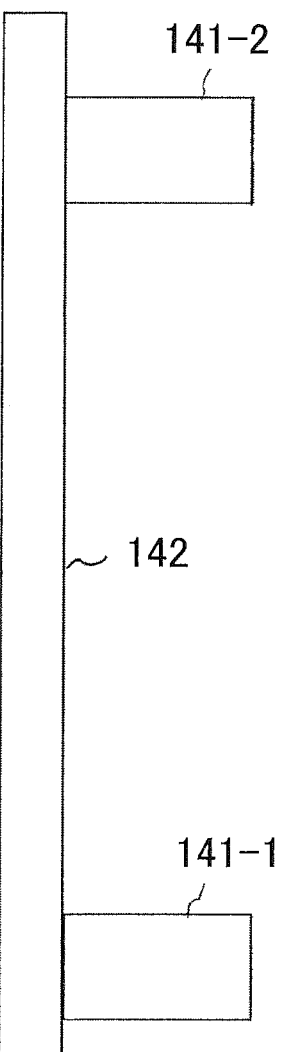

CRASH BOX AND AUTOMOBILE CHASSIS

TECHNICAL FIELD

This invention relates to a crash box and an automobile chassis. Specifically, this invention relates to a crash box and an automobile chassis buckled by receiving an impact load generated, for example, when a vehicle such as an automobile crashes, and plastically deformed in a bellows shape to absorb impact energy.

BACKGROUND ART

In prior art, a bumper reinforcement as a core member of a bumper of an automobile is detachably mounted on an end of a side member included in a part of a body shell, for example, by interposing a bonded channel-shaped bracket using appropriate means such as fasteners. Meanwhile, in recent years, the bracket is substituted with a crash box in order to improve safety of the chassis and lower a repair cost by avoiding a serious damage of the chassis in a light collision. The crash box has a tubular body buckled earlier than other member in an axial direction by an impact load exerted in its axial direction (herein, meaning a "longitudinal direction of the crash box") and plastically deformed in a (accordion-like) bellows shape to absorb impact energy.

The impact absorbing performance required in the crash box can be determined specifically based on the following factors.
  (a) If the impact load is exerted in the axial direction, the crash box is repeatedly and stably buckled in the axial direction to reliably generate plastic deformation in a bellows shape.
  (b) An average load is high when the crash box is crushed.
  (c) A maximum reactive force generated in the crushing is suppressed so as not to break down a side member that supports the crash box.

For example, Patent Literatures 1 to 5 disclose various materials and shapes for improving the impact absorbing performance of the crash box. However, even in any one of the prior arts described above, it is not easy to repeatedly and stably buckle the body in its axial direction due to the exerted impact load and plastically deform it in a bellows shape without increasing a weight by adding a partitioning wall or increasing a sheet thickness.

The applicant proposed a crash box 1 in Patent Literature 6. Referring to the cross section of FIG. 13, at least a part of the cross-sectional shape in an axial direction is a closed cross section having a generally polygonal shape, and there is no flange in the outer side of the closed cross section. Trench portions 3 and 4 extending in an axial direction of the tubular main body 2 are provided in a part of the area of a pair of sides D-I and L-A of a basic cross section defined as a polygon A-B-C-D-I-J-K-L-A having a maximum area out of polygons obtained by straightly linking a part of end points A to P of the approximate polygon, by forming an inwardly convex shape on the basic cross section A-B-C-D-I-J-K-L-A in a position other than the end points D, I, L, and A.

In the crash box 1, it is possible to obtain a high impact energy absorption amount by stably generating buckling and plastic deformation in a bellows shape against an impact load exerted in an axial direction without increasing a weight by adding a partitioning wall or increasing a sheet thickness, or generating bending in an axial direction.

In an actual automobile crash accident, an impact load caused by the crash is not always input in the axial direction of the crash box 1 continuously from the start to the end of plastic buckling deformation of the crash box 1 in a bellows shape. Instead, in many cases, the impact load is exerted obliquely with respect to the axial direction of the crash box 1. Although the crash box 1 stably and reliably generates plastic buckling deformation in a bellows shape across the entire area in the axial direction against an impact load exerted in the axial direction of the main body 2, an impact load exerted obliquely with respect to the axial direction easily generates strong bending deformation in the entire main body 2 in the middle of the plastic buckling deformation of a bellows shape due to a bending moment generated in the main body 2. Then, it is difficult to generate plastic buckling deformation in a bellows shape. Therefore, the impact energy absorption performance is degraded accordingly.

In this regard, the applicant disclosed a crash box 5 described below as illustrated in FIG. 14 in Patent Literature 7. That is, the crash box 5 includes a tubular main body 10 having a pair of corner portions 6 and 7 arranged oppositely and another pair of corner portions 8 and 9 arranged perpendicularly to a line L1 obtained by linking the corner portions 6 and 7. The tubular body 10 has a rectangular cross-sectional shape having no flange in the outer side. Here, an angle $\theta_1$ of the pair of corner portions 6 and 7 is set to 90° or larger and 150° or smaller, and an angle of the another pair of corner portions 8 and 9 is set to 30° or larger and 90° or smaller.

The cross-sectional shape of the crash box 5 has one or more inwardly convex trench portions 11 to 14 that extend in a longitudinal direction in a position other than the pair of corner portions 6 and 7 and the another pair of corner portions 8 and 9, is symmetrical with respect to a line passing through the pair of corner portions 6 and 7, and is provided in each of at least one out of two pairs of sides arranged symmetrically with respect to the line L1 passing through the pair of corner portions 6 and 7. In addition, each of the sides satisfies a relationship "$5<(W-N \times Wc)/(N+1)/t<50$", where "t" denotes a sheet thickness (mm), "W" denotes a length of the side (mm), "N" denotes the number of trench portions 11 to 14, and "Wc" denotes an average of opening widths of the N trench portions (mm).

The applicant disclosed a crash box 15 described below in Patent Literature 8 as illustrated in FIG. 15 in order to further improve the performance of the crash box 5. Specifically, the crash box 15 has a pair of corner portions 16 and 17 arranged oppositely and another pair of corner portions 18 and 19 arranged to intersect with a line obtained by linking the pair of corner portions 16 and 17 at an angle of 80° to 100°. In addition, the crash box 15 is formed from a metal tubular body 20 having a rectangular basic cross-sectional shape, so that an impact load is exerted from one end to the other end in an axial direction of the tubular body 20.

In addition, in the crash box 15, an angle of the pair of corner portions 16 and 17 is set to 90° or larger and 150° or smaller, and an angle of the another pair of corner portions 18 and 19 is set to 30° or larger and 90° or smaller. In addition, the crash box 15 has one or more inwardly convex trench portions 21 to 24 extending in a longitudinal direction in a position other than the pair of corner portions 16 and 17 and the another pair of corner portions 18 and 19. Furthermore, a cross-sectional peripheral length of the tubular body 20 in one end side is shorter than a cross-sectional peripheral length of the tubular body 20 in the other end side.

In the crash box 15, it is possible to continuously and stably generate plastic buckling deformation in a bellows shape even when an impact load caused by a crash is exerted obliquely as well as in a direction parallel to the axis direction. As a result, the crash box 15 has an excellent impact absorption characteristic (herein, referred to as "robustness"), that is, a large absorption amount of impact absorption energy even for an oblique crash.

In the crash box 15, crushing of the tubular body 20 reliably progresses from the impact end side when an impact force is exerted to the tubular body 20. Even when an impact load caused by a crash is exerted obliquely from an axial direction of the tubular body 20, crushing of the tubular body 20 propagates from one end where the impact load is exerted to the other end in the axial direction of the tubular body 20, so that the tubular body 20 can reliably and effectively buckled and deformed in a bellows shape to absorb impact energy.

CITATION LIST

Patent Literatures

Patent Literature 1: JP H8-128487 A
Patent Literature 2: JP H9-277953 A
Patent Literature 3: JP 2003-48569 A
Patent Literature 4: JP 2002-284033 A
Patent Literature 5: JP H8-108863 A
Patent Literature 6: JP 3912422 B1
Patent Literature 7: JP 2009-18447 A
Patent Literature 8: JP 2011-51581 A

SUMMARY OF INVENTION

Higher robustness is required in a crash box in order to improve safety of an automobile.

An object of this invention is to provide a crash box having robustness higher than that disclosed in Patent Literature 8 and an automobile chassis installed with the crash box.

This invention has been achieved based on a technical concept that, in the crash box disclosed in Patent Literature 8, robustness can be further improved compared to the crash box disclosed in Patent Literature 8 by forming opposite slope surfaces of the trench portion at different heights (length of the oblique side on the cross section) and forming all of the sides on the cross section in one end (impact load exerting portion) of the tubular body to be parallel to the opposite side on the cross section in the other end of the tubular body.

A crash box including a metal tubular body of a rectangular basic cross-sectional shape having a pair of corner portions arranged oppositely and another pair of corner portions arranged to intersect at an angle of 80° or larger and 100° or smaller with respect to a line obtained by linking the pair of corner portions to receive an impact load from one end to the other end in an axial direction of the tubular body, wherein, on the cross section of the tubular body, (i) an angle α of the pair of corner portions is set to 90° or larger and 150° or smaller, an angle β of the another pair of corner portions is set to 30° or larger and 90° or smaller, (ii) one or more inwardly convex trench portions extending in a longitudinal direction are provided in each of a pair of sides interposing at least either one of the pair of corner portions, (iii) a cross-sectional peripheral length of the tubular body in the one end side is shorter than a cross-sectional peripheral length of the tubular body in the other end side, (iv) an aspect ratio (flatness) between the longest one and the shortest one of diagonal lines of a polygon of the basic cross-sectional shape changes depending on a position on the axial direction of the tubular body, and (v) opposite slope surfaces of the trench portion have different heights (length of an oblique side on the cross section), so that overall sides on the cross section in the one end are formed in parallel to the opposite sides on the cross section in the other end.

According to this invention, there is also provided an automobile chassis having one or two pair (s) of crash boxes arranged symmetrically with respect to a vehicle width center in a width direction of front or rear portion of the chassis.

According to this invention, it is possible to provide a crash box having robustness higher than that disclosed in Patent Literature 8 and an automobile chassis installed with the crash box.

BRIEF DESCRIPTION OF DRAWINGS

FIG. 4A is an explanatory diagram illustrating an exemplary cross-sectional shape of one end (impact end) of a crash box according to another embodiment of this invention;

FIG. 4B is an explanatory diagram illustrating an exemplary cross-sectional shape of the other end (anti-impact end) of the crash box according to another embodiment of this invention;

FIG. 10A is a front view illustrating an installation state of the crash box installed in a bumper reinforcement;

FIG. 10B is a top plan view illustrating an installation state of the crash box installed in the bumper reinforcement;

DESCRIPTION OF EMBODIMENTS

Hereinafter, this invention will be described with reference to the accompanying drawings.

Figure 1:
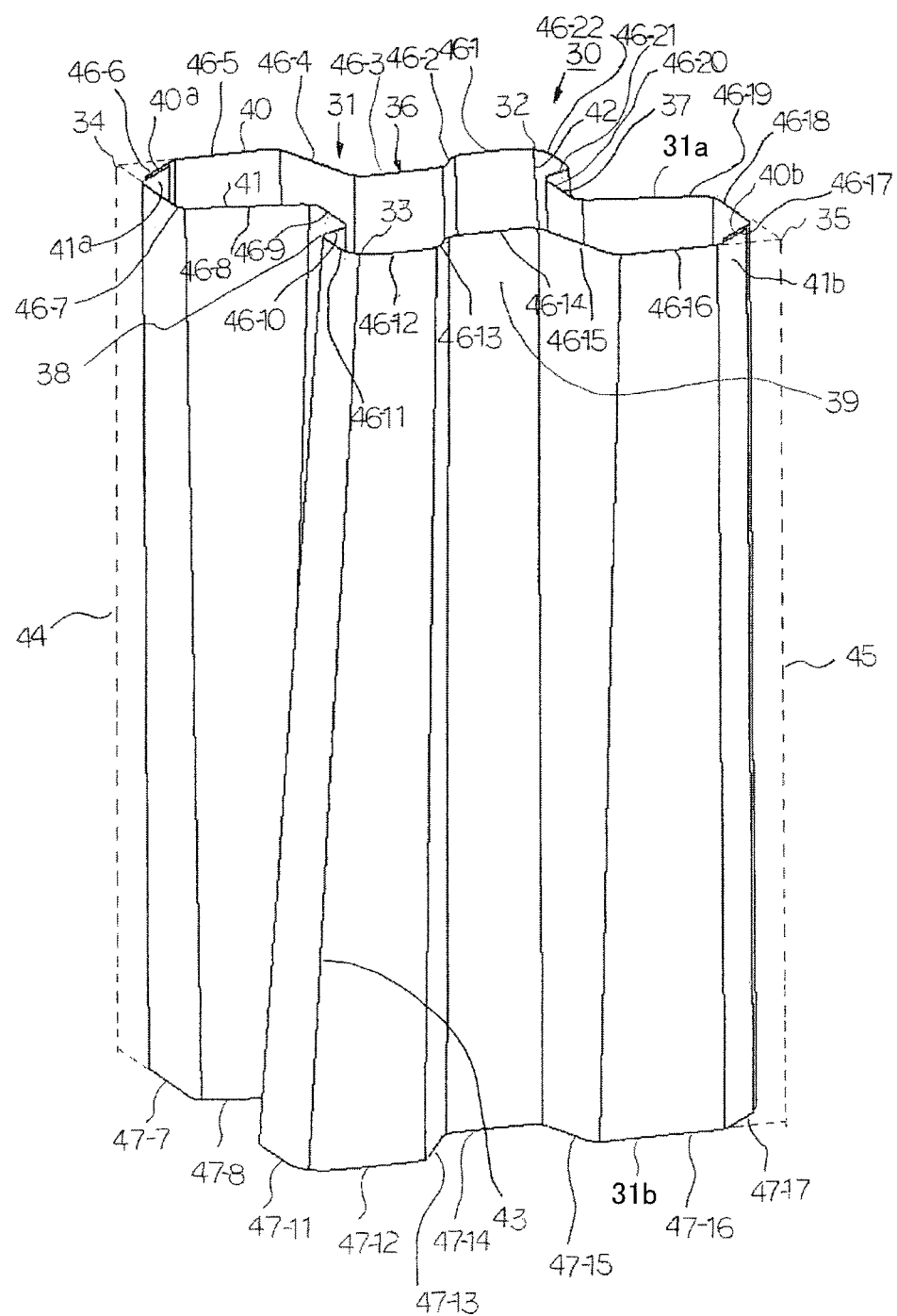
FIG. 1 is a perspective view illustrating an exemplary shape of a crash box according to this invention.
Figure 2A:
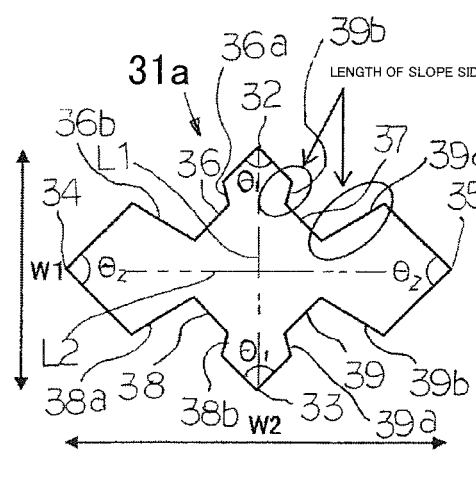
FIG. 2A is an explanatory diagram illustrating an exemplary cross-sectional shape of one end (impact end) of the crash box according to an embodiment of this invention.
Figure 2B:
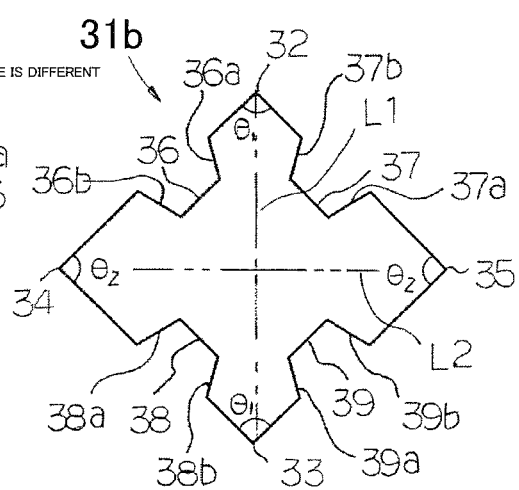
FIG. 2B is an explanatory diagram illustrating an exemplary cross-sectional shape of the other end (anti-impact end) of the crash box according to an embodiment of this invention.

FIG. 1 is a perspective view illustrating an exemplary shape of a crash box 30 according to an embodiment of this invention. FIG. 2A is an explanatory diagram illustrating an exemplary cross-sectional shape of one end (impact end) 31a of the crash box 30 according to an embodiment of this invention. FIG. 2B is an explanatory diagram illustrating an exemplary cross-sectional shape of the other end (anti-impact end) 31b of the crash box 30 according to an embodiment of this invention.

It is noted that, although FIG. 1 shows a case where the crash box 30 has bonding surfaces 40a, 41a, 40b, and 41b, a contour of the crash box 30 that does not have the bonding surfaces 40a, 41a, 40b, and 41b is also illustrated together as a dotted line.

As illustrated in FIG. 1, the crash box 30 according to this embodiment has a metal tubular body 31. The crash box 30 may be formed only by the tubular body 31, or a mount plate bonded for installation to a bumper reinforcement or a side member may be provided in one or both ends of the tubular body 31. Using the mount plate, the crash box 30 can be detachably installed.

The bumper reinforcement is bonded to one end 31a of the crash box using a suitable means such as welding. In addition, the other end 31b is preferably detachably installed in the side member, which is a part of the body shell of the automobile chassis, directly or indirectly using the mount plate.

The crash box 30 receives an impact load from the one end 31a to the other end 31b in an axial direction of the tubular body 31 by interposing the bumper reinforcement.

The tubular body 31 has a rectangular basic cross-sectional shape. Specifically, the "basic cross-sectional shape" of this invention refers to a rectangular cross-sectional shape that forms a contour excluding an inwardly convex trench portion on the cross section of the tubular body 31. Basically, the basic cross-sectional shape refers to a rectangle defined by corner portions 32 to 35, for example, as illustrated in FIGS. 2A and 2B. However, in practice, when a slightly round portion is inevitably generated in formation of the corner portions 32 to 35, or bonding surfaces 40a, 41a, 40b, and 41b described below are formed as illustrated in FIG. 1, the "basic cross-sectional shape" refers to a virtual rectangle defined by four sides and four intersection points of a rectangle that forms a contour of the tubular body.

In the tubular body 31, the basic cross-sectional shape includes a pair of corner portions 32 and 33 arranged oppositely and another pair of corner portions 34 and 35 arranged to intersect at an angle of 80° or larger and 100° or smaller with respect to a virtual line L1 obtained by linking the pair of corner portions 32 and 33 with each other.

If the intersecting angle is smaller than 80° or larger than 100°, asymmetry of the cross-sectional shape increases. Therefore, crushing becomes unstable. The intersecting angle is preferably set to 85° or larger and 95° or smaller, and more preferably, they are generally perpendicular to each other.

In this manner, the crash box 30 has a rectangular basic cross-sectional shape in which the corner portions 32 to 35 corresponding to ridge portions having high rigidity and forming a contour of the cross-sectional shape are arranged in a direction linking the pair of corner portions 32 and 33 and a direction linking the another pair of corner portions 34 and 35.

In the crash box 30, the line linking the pair of corner portions 32 and 33 and the line linking the another pair of corner portions 34 and 35 are generally perpendicular to each other according to a preferable embodiment of this invention as described above. However, the intersecting angle may be set to 80° or larger and 100° or smaller, and more preferably, 85° or larger and 95° or smaller.

First, a principle of the crash box 30 according to this invention will be described in brief.

A cross section of the polygon as a cross-sectional shape of the crash box 30 which is the tubular body 31 includes edges serving as ridge portions of the tubular body 31 and sides which are plane portions between the ridge portions of the tubular body 31. If a load is exerted to this cross section in an axial direction of the tubular body 31, the ridge portion and the plane portion generate out-of-plane deformation (deformation toward the outside of the closed cross section).

In this case, the ridge portion having high rigidity is subjected to out-of-plane deformation relatively weaker than that of the plane portion having lower rigidity and generates a compressive strain. Then, as the exerted load increases, the amount of out-of-plane deformation in the ridge portion increases, so that the ridge portion is finally buckled and bent to generate plastic buckling deformation. As such a series of deformation is repeated several times, the crash box 30 is plastically buckled and deformed in a bellows shape and is crushed along an axial direction so as to absorb impact energy.

Such a series of deformation behaviors changes depending on a direction of the exerted load. For example, when the load is exerted obliquely with respect to the axial direction of the crash box 30, the amount of out-of-plane deformation in the ridge portion increases, and the compressive strain is reduced, compared to a case where the load is exerted in the axial direction.

As the exerted oblique load increases, the compressive strain generated in the ridge portion decreases gradually and generates strong out-of-plane deformation, so that the ridge portion is crooked with a large radius of curvature, and the entire crash box 30 is bent. In particular, as the load exerted obliquely and applied to the plane portion having low rigidity increases, the crash box 30 is easily bent.

For this reason, in order to improve an impact absorbing performance against the impact load applied obliquely with respect to the axial direction by suppressing bending of the entire crash box 30, it is effective to determine the cross-sectional shape of the crash box 30 based on the following view points.

That is, in order to make it possible to suppress bending deformation against the obliquely exerted load, it is important to (I) increase a burden of the oblique load in the ridge portion having high rigidity, that is, the ridge portion should have a cross-sectional shape such that the ridge portion is arranged against the oblique load exertion direction, and (II) form the ridge portion to have a cross-sectional shape such that the out-of-plane deformation generated by the obliquely exerted load decreases, and the compressive strain increases.

As an impact load is exerted in the axial direction of the tubular body 31 of the crash box 30, the tubular body 31 plastically buckled and deformed several times, and the impact absorption energy is determined by a load hysteresis generated in that case. That is, the number of plastic buckling deformation generated in series determines an impact energy absorption amount.

First, as an impact load is exerted to the tubular body 31, out-of-plane deformation is generated in a plane portion on the cross section of the tubular body 31, and a compressive strain is generated in the ridge portion. Then, as the exerted impact load increases, both the out-of-plane deformation of the plane portion and the compressive strain of the ridge portion increase. Finally, out-of-plane deformation is generated in the ridge portion, so that (n)th buckling is generated in the ridge portion (where "n" denotes a natural number equal to or greater than "1").

The buckling wrinkle generated by the buckling deformation in the ridge portion propagates to the plane portion, and buckling wrinkle is generated in the plane portion. Then, the buckling wrinkle generated in the plane portion is repeated, so that the next (n+1)th buckling deformation is generated in another portion of the axial direction.

An interval from generation of the (n)th buckling to generation of the (n+1)th buckling, that is, a buckling wavelength is influenced by a wrinkle size generated by buckling of the ridge portion caused by the deformation described above. In addition, the wrinkle size is dominated by the out-of-plane deformation generated in the plane portion. Therefore, in order to improve impact energy absorption performance using a plastic buckling behavior having a short buckling wavelength, it is effective to reduce out-of-plane deformation generated in the plane portion.

That is, in order to generate a series of plastic buckling deformation having a short buckling wavelength for obtaining high impact energy absorption performance while suppressing bending deformation, it is important to (III) shorten the length of the plane portion on the cross section to reduce out-of-plane deformation on the cross section, and (IV) set a short length of the plane portion as desired by providing a concave portion having a ridge line in the plane portion on the cross section.

In order to reliably progress crushing from one end side where the impact load is exerted to the other end side in the axial direction of the tubular body 31 and finally buckle and deform the crash box in a bellows shape to effectively absorb impact energy not only when an impact load is, exerted in parallel to the axial direction of the crash box 30, but also when an impact load is obliquely exerted due to an oblique crash, it is important to (V) set a cross-sectional peripheral length of the tubular body 31 in the one end 31a side where an impact load is exerted to be smaller than a cross-sectional peripheral length of the tubular body 31 in the other end 31b side.

According to this invention, assuming the principles I to V, similar to the technique disclosed in Patent Literature 8, a factor for improving robustness is added.

Preferably, the cross-sectional shape of the tubular body 31 has a shape generally symmetrical to either one of a virtual line L1 passing though the pair of corner portions 32 and 33 and a virtual line L2 passing through the another pair of corner portions 34 and 35. The tubular body 31 is formed of a metal material and has a cross-sectional shape having a rectangular basic cross-sectional shape defined by the corner portions 32 to 35. Although a common steel product or a high-tensile steel product may be used as the metal material, the invention is not limited thereto. The metal material may be suitably selected depending on specifications required as a crash box 30.

In this manner, the basic cross-sectional shape of the crash box 30 preferably has a shape generally symmetrical to the virtual line L1 passing through the pair of corner portions 32 and 33. In addition, the basic cross-sectional shape preferably has a shape generally symmetrical to the virtual line L2 passing through the another pair of corner portions 34 and 35. This is because performance against an oblique load from various exertion directions is improved as the symmetry is improved. However, it is not necessary to be perfectly symmetric in a geometrical sense, and a symmetry degree may be suitably determined depending on a specification required as a crash box 30.

In the case of an offset crash, an oblique load is exerted in a first direction (for example, vehicle width direction) or a direction perpendicular to the first direction (for example, vertical direction). Therefore, a bending moment is generated in the crash box 30. In order to stably generate plastic buckling deformation in the crash box 30 even for such an oblique load input, it is important to suppress bending deformation (crease) in the entire crash box 30 generated by the bending moment and to generate a series of plastic buckling deformation having a short buckling wavelength, as in a case where an impact load is exerted in the axial direction of the tubular body 31 by the exerted impact load. This is because the buckling wavelength increases when the bending deformation is generated in the entire tubular body 31. In this regard, the corner portions 34 and 35 having high rigidity are arranged in positions corresponding to an outer contour end where the load is exerted.

An angle $\theta_1$ of the inner corner between the pair of corner portions 32 and 33 is set to 90° or larger and 150° or smaller. An angle $\theta_2$ of the inner corner between the another pair of corner portions 34 and 35 is set to 30° or larger and 90° or smaller. The reason will be described.

The rigidity of the corner portions 32 to 35 corresponding to the ridge portions is determined by an arc length of the ridge portion. When the corner portions 32 to 35 have a certain radius of curvature, the arc length changes depending on inner corners of the corner portions 32 to 35. Therefore, in order to generate the plastic buckling deformation from this impact load without generating bending in the entire crash box 30 against the bending moment generated by the oblique impact load, an angle $\theta_1$ of the inner corner between the pair of corner portions 32 and 33 is set to 90° or larger and 150° or smaller.

If the angle $\theta_1$ exceeds 150°, the arc length of the corner portions 32 and 33 is significantly shortened when the radius of curvature of the corner round portion is set to a realistic value (1.5 mm or larger and 10.0 mm or smaller) determined in consideration of a manufacturing and design space of the crash box. Therefore, it is difficult to guarantee rigidity as desired and generate the plastic buckling deformation as desired.

In addition, the angle $\theta_2$ of the inner corner between the another pair of corner portions 34 and 35 is associated with the angle $\theta_1$ of the inner corner between the pair of corner portions 32 and 33. Therefore, if the angle $\theta_1$ is set to 90° or larger and 150° or smaller, the angle $\theta_2$ is set to 30° or larger and 90° or smaller.

Preferably, the angle $\theta_1$ is set to 90° or larger and 120° or smaller, and the angle $\theta_2$ is set to 60° or larger and 90° or smaller. As a result, the rigidity of the ridge line having an angle $\theta_1$ and the rigidity of the ridge line having an angle $\theta_2$ are balanced with a proper ratio, so that it is possible to obtain more stable buckling deformation across the entire tubular body 31.

When the another pair of corner portions 34 and 35 require higher bending rigidity than that of the pair of corner portions 32 and 33, it is preferable that the angle $\theta_1$ between the pair of corner portions 32 and 33 be larger than the angle $\theta_2$ between the another pair of corner portions 34 and 35.

This crash box 30 has a cross-sectional shape capable of increasing a burden of the oblique load in the corner portions 32 to 35 corresponding to ridge portions having high rigidity, that is, the corner portions 32 to 35 are arranged in an oblique load exertion direction. In addition, since the cross-sectional shape has the corner portions 32 to 35, it is possible to alleviate out-of-plane deformation generated by the load exerted in an oblique direction and increase a compressive strain for the corner portions 32 to 35.

The tubular body 31 is provided with one or more inwardly convex trench portions 36, 37, 38, and 39 (in this embodiment, a trench portion is formed for each of four sides) extending in a longitudinal direction in each of a pair of sides interposing at least one of the pair of corner portions 32 and 33.

The trench portions 36 to 39 are preferably provided in all of the four sides. However, the trench portion may be provided in only two sides interposing at least one of the pair of corner portions 32 and 33. In addition, it is preferable that the trench portions 36 to 39 be provided in positions other than the pair of corner portions 32 and 33 and the another pair of corner portions 34 and 35 in order to reliably crush the crash box in a bellows shape and generate plastic deformation when an impact load is exerted to the tubular body 31. Hereinafter, the trench portions 36 to 39 will be described.

The trench portions 36 to 39 satisfy the following formula (1), and preferably, the following formula (1'):

$$5 < (W - N \times Wc)/(N+1)/t < 50 \quad (1), \text{ and}$$

$$5 < (W - N \times Wc)/(N+1)/t < 30 \quad (1'),$$

where "t" denotes a sheet thickness (mm), "W" denotes a length of each side (mm), "N" denotes the number of trench portions 36 to 39, and "Wc" denotes an average of the opening widths of the N trench portions 36 to 39 (mm), in each side of a rectangle which is a basic cross-sectional shape.

As a result, the shape of the crash box 30 after buckling can have a bellows shape with a short wavelength by generating plastic buckling deformation, and high absorption performance of the impact absorption energy is obtained. Now, the reason will be described.

In order to improve an absorption amount of the impact absorption energy determined by a load hysteresis generated from continuous plastic buckling (progressive buckling) of the crash box 30 and deformation thereof, it is effective to suppress a load change from generation of buckling to generation of the next buckling, that is, shorten the buckling wavelength. The buckling wavelength closely relates to out-of-plane deformation (displacement) generated by an impact load on the cross section of the tubular body 31 of the crash box 30. As the amount of out-of-plane deformation increases, the buckling wavelength increases. Meanwhile, as the out-of-plane deformation decreases, the buckling wavelength decreases. For this reason, in order to reduce the out-of-plane deformation generated on the cross section of the tubular body 30 of the crash box 30, it is recommended to reduce a width of each side of the cross section, that is, a distance between neighboring corner portions 32 to 35.

Specifically, a distance W between the corner portions 32 to 35 is set to be smaller than 50 times of the sheet thickness t of the tubular body 31. That is, in this crash box 30, if there is a side where no trench portions 36 to 39 are provided, the sheet thickness t (mm) and the length W (mm) of the side satisfy the following formula (2):

$$5 < (W/t) < 50 \quad (2).$$

Meanwhile, in the side where the distance W between the corner portions 32 to 35 is equal to or greater than 50 times of the sheet thickness t, the trench portions 36 to 39 are provided in each side, so as to divide the length of the plane portion. As a result, the sides excluding the trench portions 36 to 39 satisfy the aforementioned formula (2).

It is noted that, even when the distance W between the corner portions 32 to 35 is smaller than 50 times of the sheet thickness, the plane portion may be divided to smaller pieces by providing the trench portions 36 to 39 in the plane portion.

It is preferable that the trench portions 36 to 39 be provided in a position where bending deformation of the entire crash box is suppressed when an oblique load is exerted, and there is no corner portion 32 to 35 serving as a start point of the plastic buckling deformation due to its load.

In this manner, in order to obtain a short buckling wavelength when the crash box 30 has a cross-sectional shape having a large width W of the plane portion, trench portions 36 to 39 are provided in the plane portion to form a new ridge portion by the trench portions 36 to 39, so that a width of the plane portion is controlled within a range where a short buckling wavelength can be obtained.

Here, in order to reliably obtain the aforementioned effect, it is preferable that each side satisfy the following relationships:

$$5 < (W - N \times Wc)/(N+1)/t < 50, \text{ and} \quad \text{Formula (1):}$$

$$5 < (W - N \times Wc)/(N+1)/t < 30, \quad \text{Formula (2):}$$

where "t" denotes a sheet thickness (mm), "W" denotes a length of the side (mm), "N" denotes the number of the trench portions 36 to 39, and "Wc" denotes an average of the opening widths of the N trench portions 36 to 39, in each side.

It is noted that, if the depth dc of the trench portions 36 to 39 is too shallow, the aforementioned effect of dividing the side decreases. Therefore, it is preferable that the depth dc of the trench portions 36 to 39 exceed 10 mm.

In this crash box 30, it is preferable that the radius of curvature R of each corner portion 32 to 35 be larger than any radius of curvature Rc of the angled portion of the trench portions 36 to 39. The reason will be described.

A geometrical moment of inertia of a thin circle is dominated by a diameter and a thickness. As the diameter increases, the geometrical moment of inertia increases. Similarly, a modulus of section affecting the bending strength also increases as the diameter increases. That is, in order to suppress bending deformation for a bending moment generated when an oblique load is exerted to the crash box 30, it is effective to set a high geometrical moment of inertia for the corner portions 32 to 35 positioned in a contour of the cross section to support the exerted load. In addition, if the radius of curvature of the angled portion of each trench portion 36 to 39 increases, a deformation resistance excessively increases in the trench portions 36 to 39, so that it is difficult to generate plastic buckling deformation in this area.

Based on the reasons described above, according to this invention, it is preferable that the radius of curvature R of each corner portion 32 to 35 that dominates the bending strength of the entire crash box 30 be larger than the radius of curvature Rc of the angled portion of each trench portion 36 to 39.

A cross-sectional peripheral length (outer peripheral length of the tubular body 31 in FIG. 2A) of the tubular body 31 in the one end 31a side of the tubular body 31 is smaller than a cross-sectional peripheral length (outer peripheral length of the tubular body 31 in FIG. 2B) of the tubular body 31 in the other end 31b side.

It is preferable that the cross-sectional peripheral length of the tubular body 31 monotonically increases from the one end 31a to the other end 31b with a constant ratio. As a result, as an impact load is exerted to the tubular body 31, crushing starts from the one end 31a side. In this case, the ridge line obtained by linking the ends 31a and 31b has a straight shape.

As illustrated in FIG. 2B, in the tubular body 31, an aspect ratio (herein, referred to as "flatness") which is a ratio between a length W2 of the longest diagonal line and a length of the shortest diagonal line out of diagonal lines of a polygon serving as a basic cross-sectional shape changes in a position along the axial direction of the tubular body 31.

In addition, heights of the opposite sloped surfaces of the trench portions 36 to 39, that is, oblique sides (36a and 36b) of the trench portion 36 in FIGS. 2A and 2B have different lengths. In addition, the oblique sides (37a and 37b) of the trench portion 37 have different lengths, and the oblique sides (38a and 38b) of the trench portion 38 have different lengths. Furthermore, the oblique sides (39a and 39b) of the trench portion 39 have different lengths. As a result, in the tubular body 31, overall sides 46-1 to 46-22 on the cross section of the one end 31a are formed in parallel to the opposite sides 47-1 to 47-22 on cross section of the other end 31b.

In the tubular body 31, it is preferable that a difference between the angle $\theta_1$ of the pair of corner portions 32 and 33 and the angle $\theta_2$ of the another pair of corner portions 34 and 35 increases or decreases from the one end 31a to the other end 31b.

As illustrated in FIG. 1, the tubular body 31 may be obtained by bonding a first steel sheet 40 and a second steel sheet 41 using a proper means (such as laser welding or spot welding). In this case, bonding surfaces 40a, 41a, 40b, and 41b formed in a plane shape for bonding the first and second steel sheets 40 and 41 may be provided in the vicinity of the another pair of corner portions 34 and 35 corresponding to each end of the first and second steel sheets 40 and 41. In this case, the another pair of corner portions 34 and 35 serves as virtual points of the tubular body 31.

In this manner, it is preferable that the tubular body 31 be formed by assembling two components obtained by bending a thin sheet using a proper means such as welding or bonding. However, without limiting thereto, the tubular material may be integratedly designed using various methods such as hydroforming or extrusion.

The crash box 30 includes plane bonding surfaces 40a, 41a, 40b, and 41b and is formed by bonding the first and second steel sheets 40 and 41 by overlappingly bonding the bonding surfaces 40a, 41a, 40b, and 41b. The width W' of the bonding surfaces 40a, 41a, 40b, and 41b is set to be greater than 5 times and smaller than 50 times, and preferably smaller than 30 times, of the sheet thickness t of the tubular body 31 of the crash box 30.

It is noted that, when the bonding surfaces 40a, 41a, 40b, and 41b are provided, the length W (mm) of the side in the Formulas (1), (1'), and (2) refers to a length of the side after being reduced by forming the bonding surfaces 40a, 41a, 40b, and 41b.

Since the bonding surfaces 40a, 41a, 40b, and 41b are provided, the plastic buckling deformation is more stably generated. However, such an effect is insignificant if the ratio (W'/t) between the width (length) W' of the bonding surfaces 40a, 41a, 40b, and 41b and the sheet thickness t is equal to or smaller than 5 times. Meanwhile, if the ratio (W'/t) is equal to or greater than 50 times, the buckling wavelength increases, and the impact energy absorption effect is reduced.

In particular, if the bonding surfaces 40a, 41a, 40b, and 41b are located in an overlapping bonding portion of an edge of a single steel sheet or overlapping bonding portions of a plurality of steel sheets, the bending rigidity of the tubular body 31 is improved when an oblique impact load is exerted. As a result, it is possible to suppress generation of bending deformation in the entire tubular body 31 in the middle of plastic buckling deformation in a bellows shape. In addition, if the bonding of the overlapping bonding portion is performed through consecutive bonding such as structural adhesive bonding or consecutive welding such as laser welding, it is possible to further improve bending rigidity of the tubular body 31, compared to an intermittent bonding such as spot welding. Therefore, the consecutive bonding is preferable.

A material of the tubular body 31 is not limited to the steel sheet. For example, a non-ferrous metal material such as aluminum alloy or a non-metal material such as resin may also be used.

If the cross-sectional peripheral length of the tubular body 31 in the one end 31a side serving as an impact end is shorter than that of the other end 31b side, it is possible to reliably generate crushing from the one end 31a side and improve stability of the impact absorbing performance during a crash. For this reason, it is preferable that the entire tubular body 31 be formed in a tapered shape along the axial direction.

In the crash box 30, a dimension of the angled portion of the tubular body 31 is set such that a difference between the angle $\theta_1$ of the pair of corner portions 32 and 33 and the angle $\theta_2$ of the another pair of corner portions 34 and 35 increases from one end 31a to the other end 31b for an impact load directly input from the front bumper reinforcement, and the cross-sectional peripheral length of the tubular body 31 (herein, the "cross-sectional peripheral length" refers to a peripheral length on the cross section of the tubular body) in the one end 31a side is shorter than the cross-sectional peripheral length of the tubular body 31 in the other end 31b side.

In the aforementioned description, the cross-sectional peripheral length of the tubular body 31 monotonically increases from the one end 31a side to the other end 31b side with a constant ratio. However, the invention is not limited thereto. For example, the cross-sectional peripheral length of the tubular body 31 may increase or decrease between the one end 31a and the other end 31b. The effect of the invention is not harmed even in this case. That is, the cross-sectional peripheral length in the one end 31a may be smaller than the cross-sectional peripheral length of the other end 31b.

Figure 3:
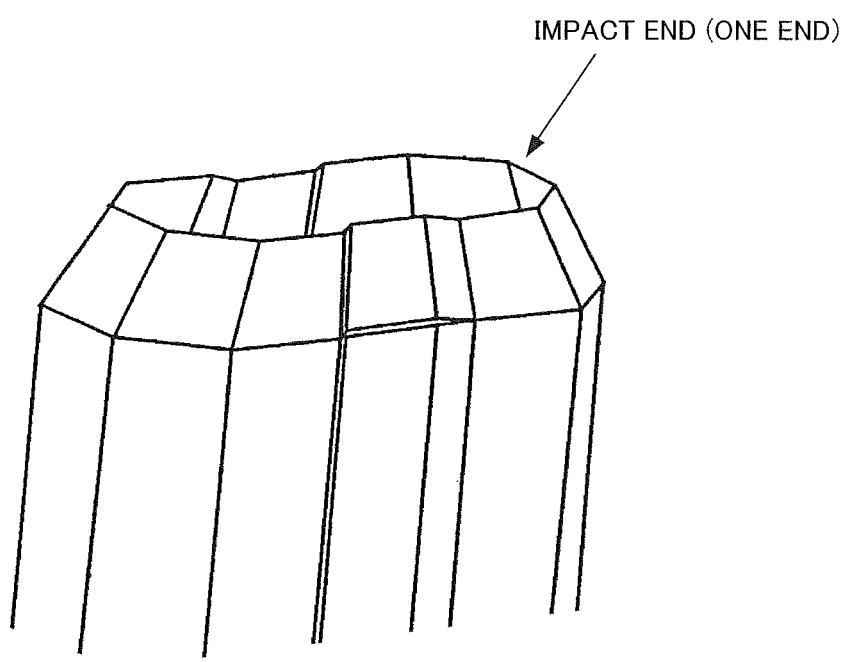
FIG. 3 is a diagram illustrating an exemplary geometry of the one end.

The cross-sectional peripheral length of the tubular body 31 may increase or decrease between one end and the other end as described below. For example, as illustrated in FIG. 3, a cross section in the vicinity of the impact end corresponding to the one end is abruptly reduced so as to facilitate deformation at the start of a crash. As a result, it is possible to generate initial deformation appropriately and guide the subsequent deformation appropriately. In addition, since the fixed end corresponding to the other end is not buckled basically, there is no need to change the cross-sectional shape. For example, the cross-sectional shape may be constant.

Here, it is preferable that a ratio of the cross-sectional peripheral length defined as "(cross-sectional peripheral length of one end 31a)/(cross-sectional peripheral length of the other end 31b)" be set to 0.6 or greater or 0.9 or smaller. If the ratio of the cross-sectional peripheral length is smaller than 0.6, the initial load after starting a crash excessively decreases, so that the energy absorption performance in the initial stage of the crash is degraded. Meanwhile, if the ratio of the cross-sectional peripheral length exceeds 0.9, the effect of the invention, that is, stable buckling by suppressing bending deformation in the case of an oblique impact is degraded, and bending may easily be generated.

In the aforementioned example, an increase of the cross-sectional peripheral length of the tubular body 31 is vertically symmetrical as seen from the side of the chassis. However, an increase of the cross-sectional peripheral length is not limited thereto. A degree of the increase of the cross-sectional peripheral length in the area over a horizontal plane passing through a center of the tubular body 31 may be different from a degree of the increase of the cross-sectional peripheral length in the area under the horizontal plane.

If the cross-sectional peripheral length of the tubular body 31 in the one end 31a side is shorter than the cross-sectional peripheral length of the tubular body 31 in the other end 31b side, crushing reliably progresses from the one end 31a to the other end 31b as an impact load is input to the one end 31a from the front bumper reinforcement. Finally, it is possible to buckle and deform the tubular body 31 in a bellows shape and effectively absorb impact energy.

If the pair of corner portions 32 and 33 is vertically separated in the other end 31b side of the tubular body 31, rigidity in the vicinity of the other end 31b side against vertical bending increases, compared to the impact end side. This makes it possible to suppress vertical bending deformation generated in the crash box during crushing. As a result, it is possible to suppress a bending force from propagating to the side member. In addition, it is possible to reduce vibration or noise of the chassis, caused by vertical vibration of an engine, transmitted through an engine mount bracket arranged on an upper surface of the front side member.

The tubular body 31 preferably has a tapered shape of which cross section does not have a similar shape across the entire cross section in the axial direction, but changes to a certain direction. Specifically, by changing the flatness along the axial direction, it is possible to obtain sufficient robustness against the oblique load.

FIG. 4A is an explanatory diagram illustrating an exemplary cross-sectional shape of one end (impact end) 31a of a crash box 30-1 according to another embodiment of this invention. FIG. 4B is an explanatory diagram illustrating an exemplary cross-sectional shape of the other end (anti-impact end) 31b of the crash box 30-1 according to another embodiment of this invention.

For example, as illustrated in FIGS. 2A and 2B, if the flatness of the one end 31a is designed to be greater than the flatness of the other end 31b, the shape of the one end 31a becomes flatter. In this case, if a load is obliquely exerted to the crash box 30, in the other end 31b, the one having a shorter length out of the pair of corner portions 32 and 33 and the another pair of corner portions 34 and 35 has rigidity lower than that of the other one having a longer length. Therefore, while the one having higher rigidity suppresses an early collapse of the tubular body 31 that receives an impact load, the other one having lower rigidity serves as a start point so that crushing can easily start from the one end 31a.

In comparison, as illustrated in FIGS. 4A and 4B, if the flatness of the one end 31a side is designed to be lower than the flatness of the other end 31b side, the one end 31a side is approximated to a square shape, compared to the other end 31b side. Therefore, robustness in the impact load exertion direction is improved.

Which of the one end 31a or the other end 31b has higher flatness may be appropriately selected depending on utilization of the crash box, required performance, and the like.

Figure 5:
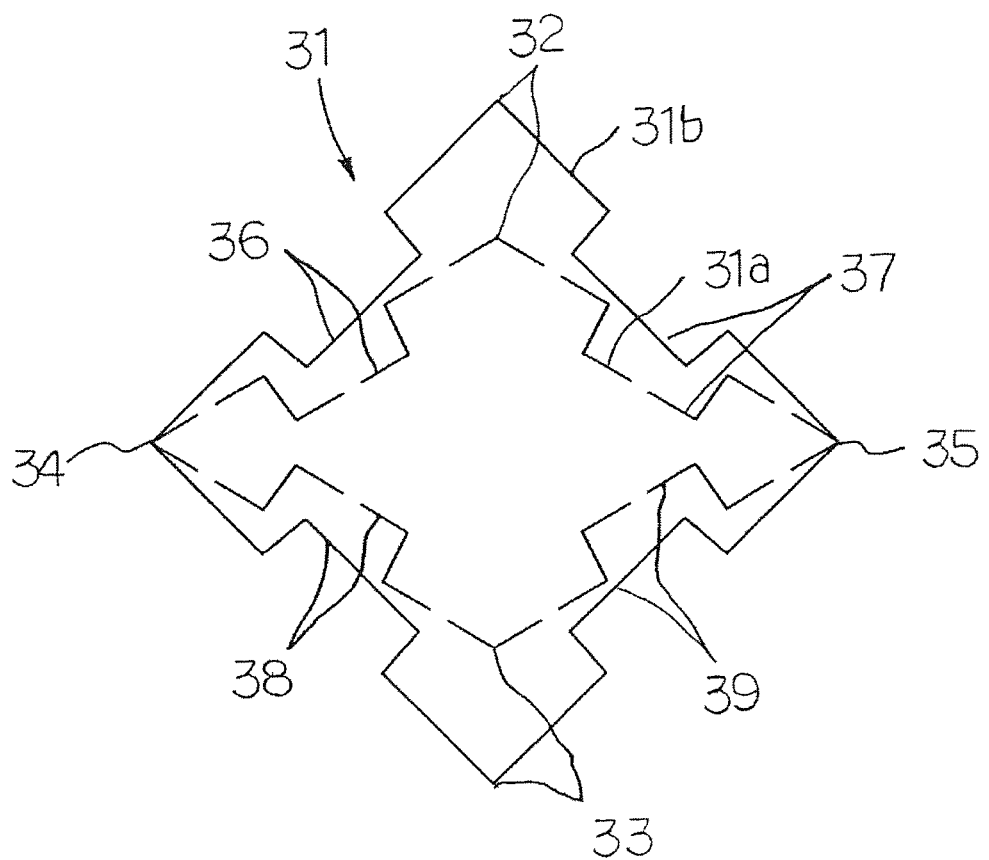
FIG. 5 is an explanatory diagram illustrating that the crash box does not work when opposite slope surfaces of the trench portion have the same height.

FIG. 5 is an explanatory diagram illustrating that a crash box does not work when opposite slope surfaces (36a and 36b), (37a and 37b), (38a and 38b), and (39a and 39b) of the trench portions 36 to 39, respectively, have the same height. In FIG. 5, the shape of the tubular body 31 in the one end 31a is denoted by a dotted line, and the shape of the tubular body 31 in the other end 31b is denoted by a solid line. The flatness of the one end 31a serving as an impact end is higher than the flatness of the other end 31b.

Figure 6:
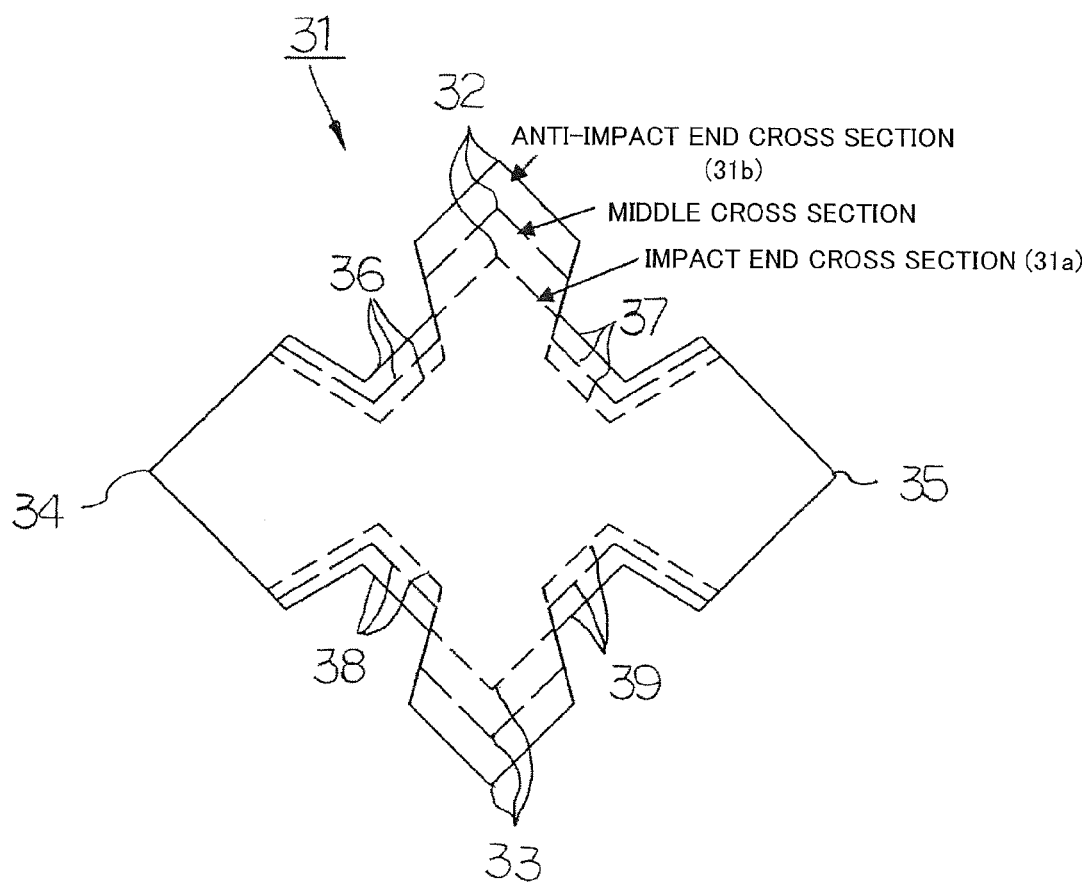
FIG. 6 is an explanatory diagram collectively illustrating cross-sectional shapes of one end (impact end), a middle end, and the other end (anti-impact end) of a crash box according to still another embodiment of this invention, in which flatness is high in the impact end.
Figure 7:
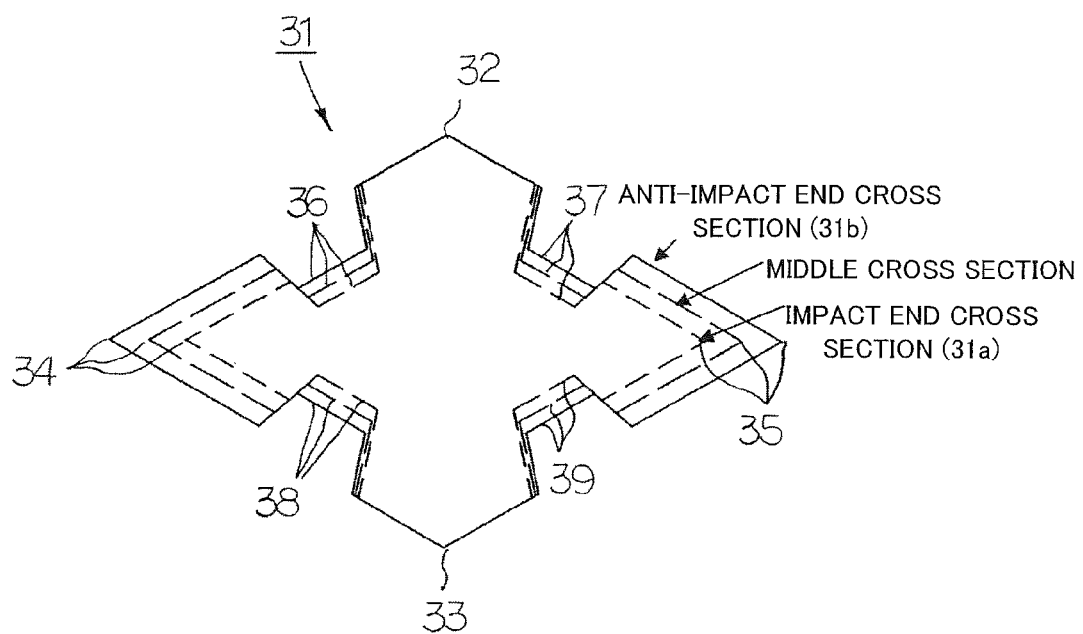
FIG. 7 is an explanatory diagram collectively illustrating cross-sectional shapes of one end (impact end), a middle end, and the other end (anti-impact end) of the crash box according to still another embodiment of this invention, in which flatness is low in the impact end.

In comparison, FIG. 6 is an explanatory diagram collectively illustrating cross-sectional shapes of the one end 31a (impact end), the middle, and the other end 31b (anti-impact end) in an exemplary crash box 30 in which the flatness is higher in the one end 31a. FIG. 7 is an explanatory diagram collectively illustrating cross-sectional shapes of the one end 31a (impact end), the middle, and the other end 31b (anti-impact end) in an exemplary crash box 30 in which the flatness is lower in the one end 31a.

As described above, in the tubular body 31, the opposite slope surfaces (36a and 36b), (37a and 37b), (38a and 38b), and (39a and 39b) of the trench portions 36 to 39, respectively, have different heights (the length of the oblique side on the cross section). This is because, when the slope surfaces (36a and 36b), (37a and 37b), (38a and 38b), and (39a and 39b) have the same height, and the flatnesses of the one end 31a as an impact end and the other end 31b as an anti-impact end change as illustrated in FIG. 5, tilting is inevitably generated in the tubular body 31, so that the manufacturing of the tubular body 31 becomes difficult. In addition, since the ridge lines 42 to 45 (refer to FIG. 1) of the tubular body 31 including each of the corner portions 32 to 35 may be tilted, it is not suitable for a crash box that requires robustness.

In this regard, if the opposite slope surfaces (36a and 36b), (37a and 37b), (38a and 38b), and (39a and 39b) of the trench portions 36 to 39, respectively, have different heights (the length of the oblique side on the cross section) as illustrated in FIGS. 1 to 4, 6, and 7, it is possible to design the crash box such that overall sides 46-1 to 46-22 included in the cross section in the one end 31a and the opposite sides 47-1 to 47-22 included in the cross section of the other end 31b are in a parallel relationship without having tilting.

The crash box 30 according to this invention is configured as described above. The crash box is preferably installed in the automobile chassis such that one or two pairs are arranged with respect to the vehicle width center along a width direction of the front or rear side of the automobile chassis.

Specifically, the crash box 30 is formed from a metal tubular body 31 having a closed cross-sectional shape of which the entire length is set to, generally, 80 mm or longer and 300 mm or shorter. The crash box 30 is bonded to a bumper reinforcement using a proper means such as welding so as to be detachably installed in the area set in ends of the left and right side members that support the bumper reinforcement by interposing amount plate. Similar to a normal case, a total of two crash boxes 30 are arranged in the bumper reinforcement in the vehicle width direction to face the front-rear direction of the chassis.

In this case, the crash box 30 according to this invention is preferably arranged such that the virtual line L1 obtained by linking the pair of corner portions 32 and 33 is directed in an approximately vertical or horizontal direction.

In this manner, even for an oblique impact as well as a front impact, the crash box 30 is crushed by generating plastic buckling deformation in a bellows shape ahead of the side member included in the body shell from an impact load input to the bumper reinforcement to absorb the impact energy. As a result, it is possible to reduce a repair cost by protecting damage to the body shell in a light collision and protect passengers by effectively absorbing the impact energy along with the side member.

In the example of FIGS. 1 to 4, 6, and 7, the trench portion is provided in each of the four basic sides 36 to 39 of the cross section. However, the trench portion may be provided only in a pair of sides (36 and 37), (38 and 39), (36 and 38), or (37 and 39) interposing any one of the corner portions 32 to 35.

Figure 8:
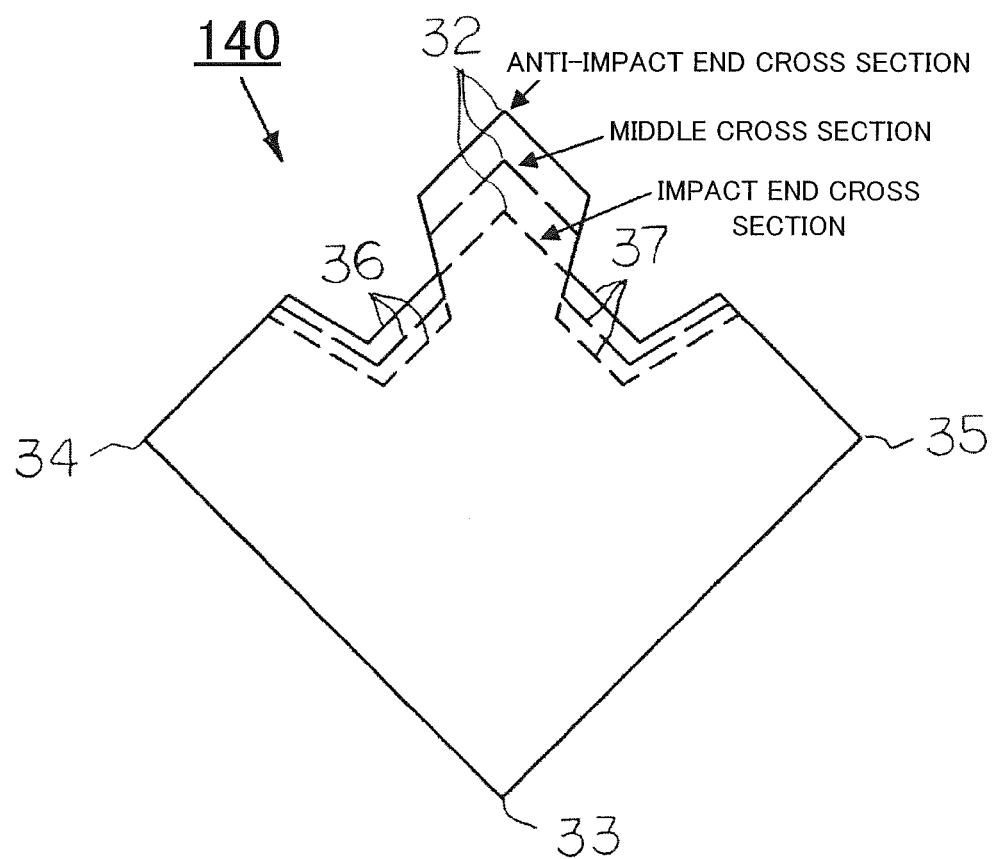
FIG. 8 is an explanatory diagram illustrating a crash box having a cross section when a trench portion is provided in a pair of sides interposing a single corner portion, in which flatness is high in the impact end side.
Figure 9:
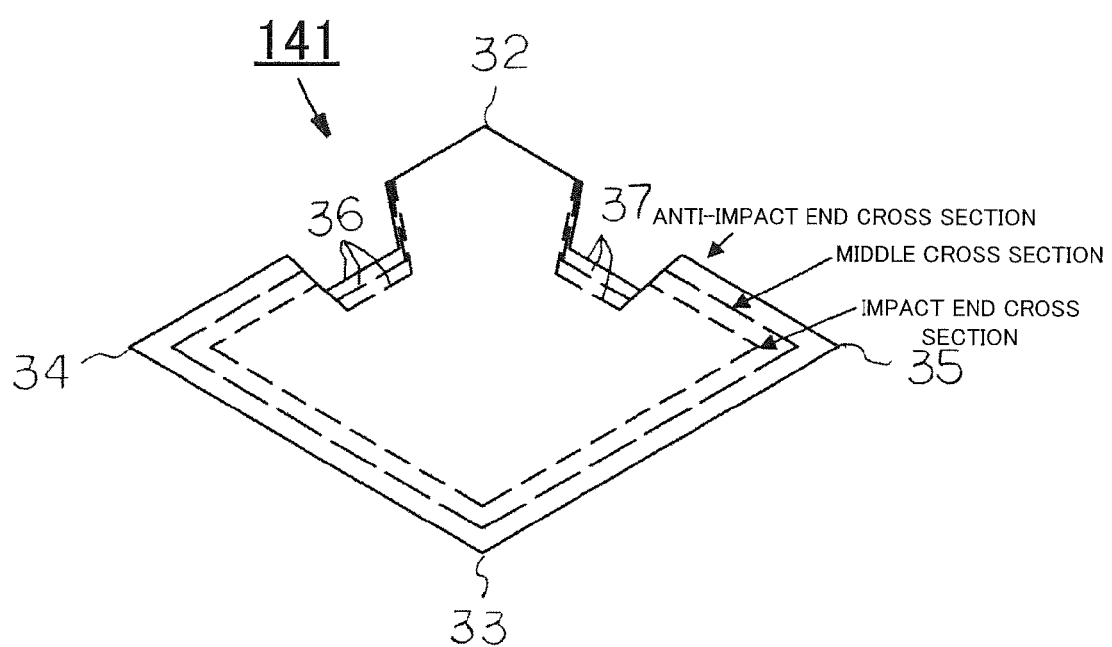
FIG. 9 is an explanatory diagram illustrating a crash box having a cross section when a trench portion is provided in a pair of sides interposing a single corner portion, in which flatness is low in the impact end side.

FIG. 8 illustrates a crash box 140 having a cross section when a trench portion is provided in a pair of sides (36 and 37) interposing a single corner portion 32, in which the flatness is higher in the impact end side. In addition, FIG. 9 illustrates a crash box 141 having a cross section when a trench portion is provided in a pair of sides (36 and 37) interposing a single corner portion 32, in which the flatness is lower in the impact end side. Furthermore, FIG. 10A is a front view when the crash box 141 is installed in the bumper reinforcement 142. FIG. 10B is a top plan view when the crash box 141 is installed in the bumper reinforcement 142.

The crash boxes 140 and 141 having cross sections of FIGS. 8 and 9 are installed in the bumper reinforcement 142 as illustrated in FIGS. 10A and 10B. For example, in the case of the crash box 141, the crash box 141-1 is installed in the left side of the bumper reinforcement 142, and the crash box 141-2 is installed in the right side of the bumper reinforcement 142.

When a crash occurs from the front left side of the automobile as illustrated in FIG. 10B, an impact force that bends the crash box 141-1 so as to rotate the front side of the automobile in a clockwise direction is exerted to the crash box 141-1 installed in the left side. However, since the crash box 141-1 has high rigidity in the sides (36 and 37) having a trench portion on the cross section, it is possible to absorb the impact without bending.

EXAMPLES

The effect of the crash box according to this invention was evaluated by performing a numerical analysis.

The crash box 30 having the shape of FIGS. 1, 2, and 6 is fixed on a floor surface with an inclination of 15°, and a rigid wall was crashed in the axial direction of the crash box 30 at a speed of 16 km/h, so that an analysis was performed by crushing the crash box 30 in the axial direction by 150 mm to examine a plastic buckling behavior of the crash box 30.

In addition, in Comparative Examples 1 and 2, the same analysis was performed using a crash box having a basic square cross-sectional shape. It is noted that the sheet thickness of each crash box was set to 1.2 mm, and a length of the tubular body of the crash box in the axial direction was set to 200 mm. In the analysis, a material characteristic was used by assuming a high-tensile steel sheet of 440 MPa, and strain speed dependence was considered based on the Cowper-Symonds material deformation law.

Here, the shape of Comparative Example 2 corresponds to Example 4 discussed in the example of Patent Literature 8 considered by the inventors.

Figure 11B:
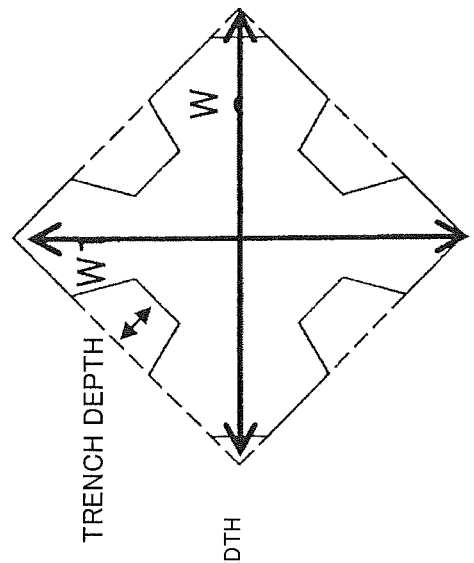
FIG. 11B is an explanatory diagram illustrating exemplary cross-sectional shapes of crash boxes according to Comparative Examples 1 to 3.
Figure 11A:
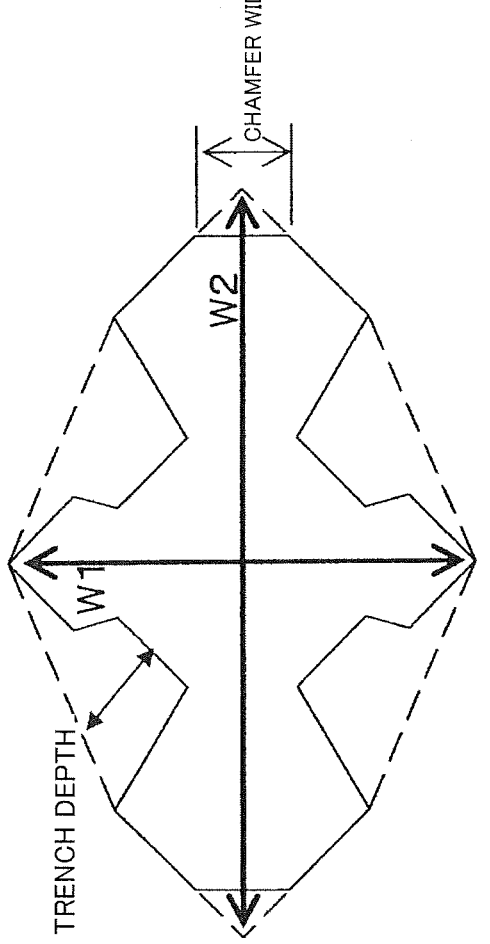
FIG. 11A is an explanatory diagram illustrating an exemplary cross-sectional shape of a crash box according to Example 1.
Figure 12:
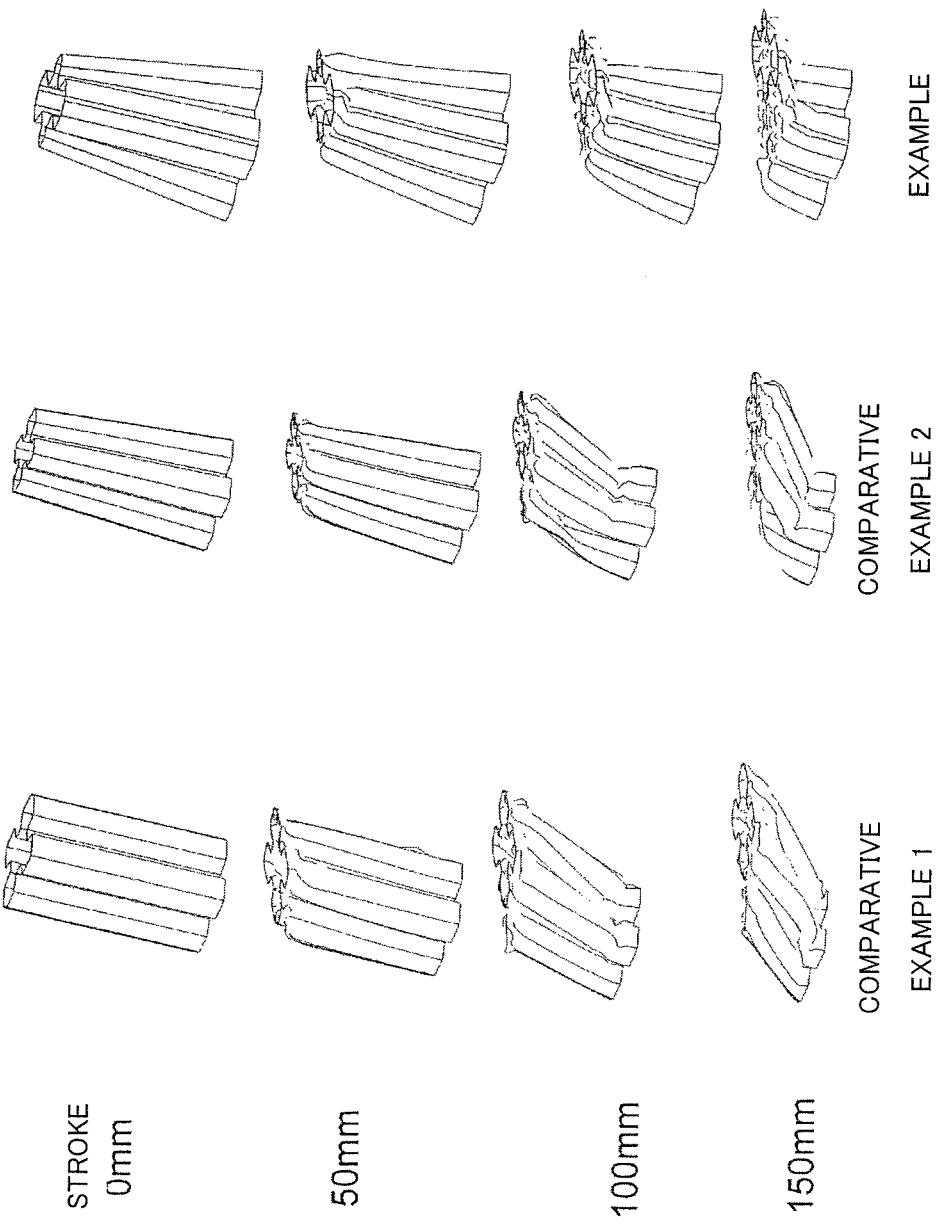
FIG. 12 is an explanatory diagram illustrating a crushing state when a crushing stroke is set to 0 mm, 50 mm, 100 mm, and 150 mm according to Example 1 and Comparative Examples 1 to 3.
Figure 13:
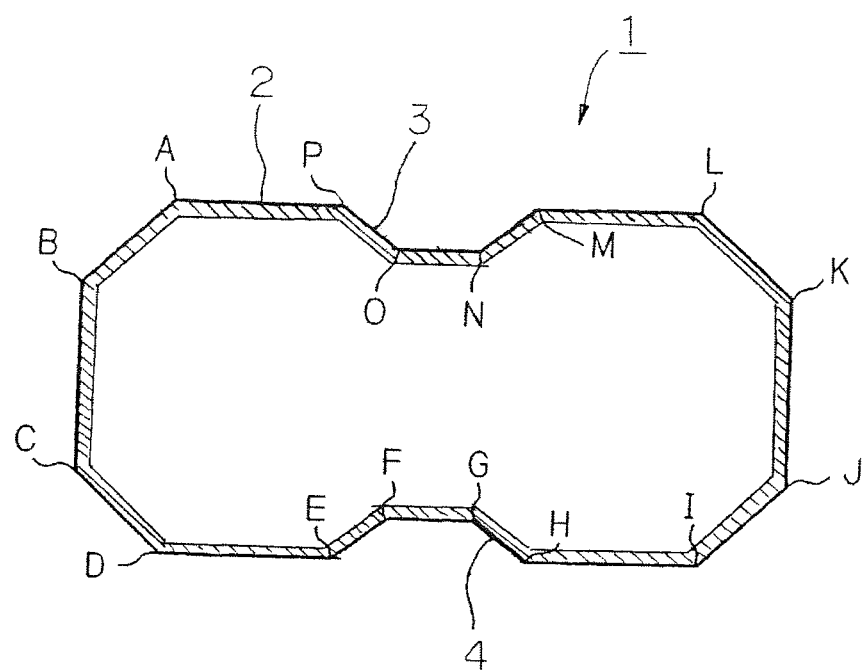
FIG. 13 is an explanatory diagram illustrating an exemplary cross-sectional shape of the crash box discussed in Patent Literature 6.
Figure 14:
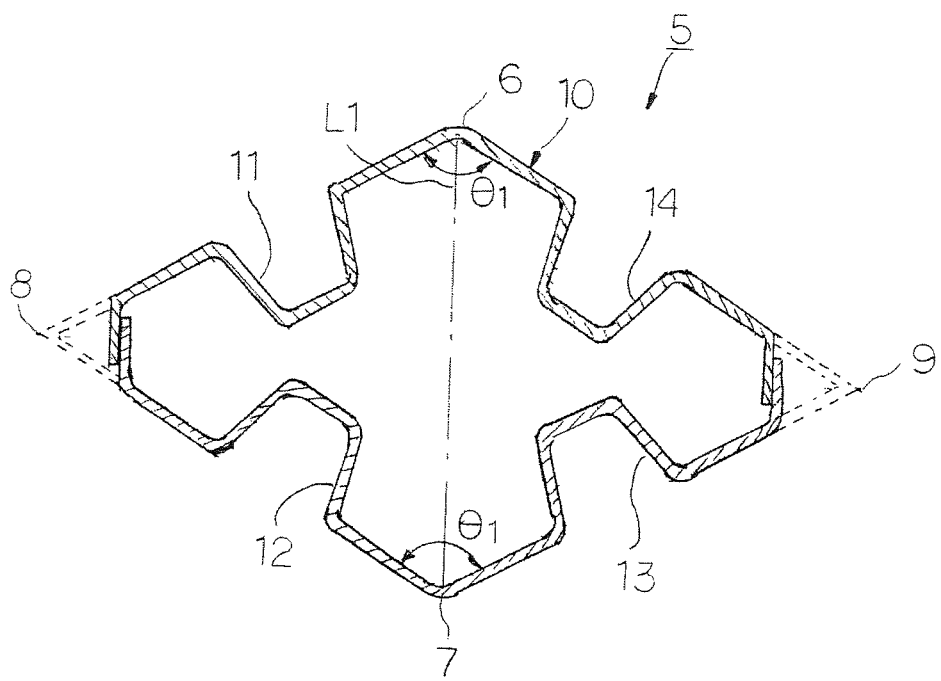
FIG. 14 is an explanatory diagram illustrating an exemplary cross-sectional shape of the crash box disclosed in Patent Literature 7.
Figure 15:
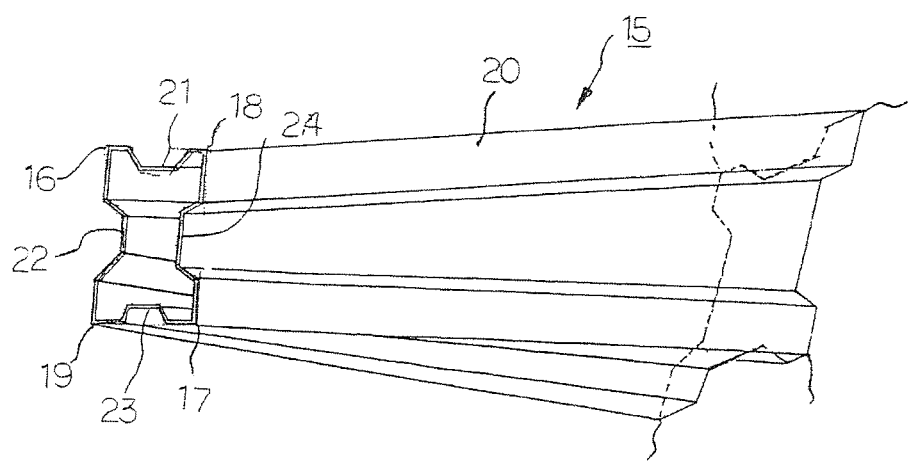
FIG. 15 is an explanatory diagram illustrating an exemplary cross-sectional shape of the crash box disclosed in Patent Literature 8.

FIG. 11 and Table 1 show a shape of the crash box in this Example and Comparative Examples 1 and 2. In addition, FIG. 12 shows a crushing state of the crash box when a crushing stroke is set to 0 mm, 50 mm, 100 mm, and 150 mm in Example 1 and Comparative Examples 1 and 2.

It is noted that Table 1 shows a crushing load ratio F1/F2 between an average crushing load F1 under a pressing length 40 mm to 60 mm where deformation at the start of crushing is stabilized and an average crushing load F2 under a pressing length 120 mm to 140 mm.

TABLE 1

| classification | impact end side | | | | anti-impact end side | | | | ratio of cross-sectional peripheral length (L1/L2) | crushing load ratio (F1/F2) |
| --- | --- | --- | --- | --- | --- | --- | --- | --- | --- | --- |
| | cross-sectional peripheral length L1 (mm) | trench depth (mm) | chamfer width (mm) | W2/W1 | cross-sectional peripheral length L2 (mm) | trench depth (mm) | chamfer width (mm) | W2/W1 | | |
| comparative example 1 | 483 | 20 | 17 | 1 | 483 | 20 | 17 | 1 | 1.00 | 0.53 |
| comparative example 2 | 341 | 15 | 17 | 1 | 483 | 20 | 17 | 1 | 0.71 | 0.49 |
| example 1 | 460 | 19 | 17 | 2 | 542 | 20 | 17 | 1 | 0.85 | 0.93 |

As shown in Table 1 and FIG. 12, in both Comparative Examples 1 and 2, bending deformation is generated in a rear half of the crushing stroke, and unstable buckling occurs. Therefore, a crushing load in the rear half significantly decreases, so that the crushing load ratio becomes 0.5 or lower.

DESCRIPTION OF THE REFERENCE NUMERALS 30 crash box
31 tubular body
31a one end (impact end)
31b the other end (anti-impact end)
32, 33, 34, 35 corner portion
36, 37, 38, 39 trench portion
36a, 36b oblique side
37a, 37b oblique side
38a, 38b oblique side
39a, 39b oblique side
40 first steel sheet
41 second steel sheet
40a, 41a, 40b, 41b bonding surface
42, 43, 44, 45 ridge line
46-1 to 46-22 overall sides to form cross section in one end
47-1 to 47-22 opposite sides to form cross section in the other end

The invention claimed is:

1. A crash box comprising a metal tubular body of a rectangular basic cross-sectional shape having a pair of corner portions arranged oppositely and another pair of corner portions arranged to intersect at an angle of 80° or larger and 100° or smaller with respect to a line obtained by linking the pair of corner portions to receive an impact load from one end to the other end in an axial direction of the tubular body,
wherein, on a cross section of the tubular body,
an angle of the pair of corner portions is set to 90° or larger and 150° or smaller,
an angle of said another pair of corner portions is set to 30° or larger and 90° or smaller,
one or more inwardly convex trench portions extending in a longitudinal direction are provided in each of a pair of sides interposing at least either one of the pair of corner portions,
a cross-sectional peripheral length of the tubular body in the one end side is shorter than a cross-sectional peripheral length of the tubular body in the other end side,
an aspect ratio (flatness) between the longest one and the shortest one of diagonal lines of a polygon of the basic cross-sectional shape changes depending on a position on the axial direction of the tubular body, and
opposite slope surfaces of the trench portion have different heights (length of an oblique side on the cross section), so that overall sides on the cross section in the one end are formed in parallel to the opposite sides on the cross section in the other end.

2. The crash box according to claim 1, wherein the cross-sectional shape has an approximately symmetric shape with respect to at least either one of a line passing through the pair of corner portions and a line passing through said another pair of corner portions.

3. The crash box according to claim 1, wherein a difference between the angle of the pair of corner portions and the angle of said another pair of corner portions increases from the one end to the other end.

4. The crash box according to claim 1, wherein a difference between the angle of the pair of corner portions and the angle of said another pair of corner portions decreases from the one end to the other end.

5. The crash box according to claim 1, wherein the trench portion is provided in all of four sides.

6. The crash box according to claim 1, wherein an area including at least one corner portion has a plane bonding surface.

7. The crash box according to claim 1, wherein a cross-sectional peripheral length of the tubular body monotonically increases from the one end to the other end.

8. The crash box according to claim 1, wherein the trench portion is provided in a position other than the pair of corner portions and said another pair of corner portions.

9. An automobile chassis comprising the crash box according to claim 1, wherein one or two pairs of crash boxes are symmetrically arranged with respect to a vehicle width center in a width direction in a front or rear portion of the chassis.

10. The automobile chassis comprising the crash box according to claim 9, wherein the crash box is arranged such that a line obtained by linking the pair of corner portions is directed to an approximately vertical or horizontal direction.

* * * * *